(12) United States Patent
Buckingham et al.

(10) Patent No.: US 7,899,866 B1
(45) Date of Patent: Mar. 1, 2011

(54) USING MESSAGE FEATURES AND SENDER IDENTITY FOR EMAIL SPAM FILTERING

(75) Inventors: Jay T. Buckingham, Kirkland, WA (US); Geoffrey J Hulten, Lynwood, WA (US); Joshua T. Goodman, Redmond, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 11/027,895

(22) Filed: Dec. 31, 2004

(51) Int. Cl.
*G06F 15/16* (2006.01)
*G06F 11/00* (2006.01)

(52) U.S. Cl. ........................ 709/206; 726/22
(58) Field of Classification Search .................. 706/206
See application file for complete search history.

(56) References Cited

U.S. PATENT DOCUMENTS

| | | | |
|---|---|---|---|
| 6,161,130 A * | 12/2000 | Horvitz et al. | 709/206 |
| 6,434,601 B1 | 8/2002 | Rollins | |
| 6,671,718 B1 | 12/2003 | Meister et al. | |
| 6,775,590 B2 | 8/2004 | Pintsov et al. | |
| 6,970,908 B1 | 11/2005 | Larky et al. | |
| 7,051,077 B2 * | 5/2006 | Lin | 709/207 |
| 7,249,175 B1 | 7/2007 | Donaldson | |
| 7,444,384 B2 | 10/2008 | Horvitz | |
| 2003/0046421 A1 * | 3/2003 | Horvitz et al. | 709/238 |
| 2004/0177120 A1 * | 9/2004 | Kirsch | 709/206 |
| 2004/0199587 A1 | 10/2004 | McKnight | |
| 2005/0021637 A1 | 1/2005 | Cox | |
| 2005/0060643 A1 | 3/2005 | Glass et al. | |
| 2005/0102366 A1 * | 5/2005 | Kirsch | 709/207 |
| 2005/0144245 A1 | 6/2005 | Lowe | |
| 2005/0153686 A1 | 7/2005 | Kall et al. | |
| 2005/0198159 A1 * | 9/2005 | Kirsch | 709/206 |
| 2006/0015942 A1 * | 1/2006 | Judge et al. | 726/24 |
| 2006/0031328 A1 | 2/2006 | Malik | |
| 2006/0059238 A1 * | 3/2006 | Slater et al. | 709/206 |
| 2006/0168057 A1 | 7/2006 | Warren et al. | |

OTHER PUBLICATIONS

Paul Graham, "A Plan for Spam", 2002.*
Hulten, et al., "Filtering Spam E-Mail on a Global Scale", ACM Press, In the Proceedings of the Thirteenth International World Wide Web Conference, 2004, pp. 366-367 (2 pgs.).
McDowell, et al., "Semantic Email", ACM, 2004, pp. 11.

* cited by examiner

*Primary Examiner*—Shirley X Zhang
(74) *Attorney, Agent, or Firm*—Lee & Hayes, PLLC

(57) ABSTRACT

Email spam filtering is performed based on a sender reputation and message features. When an email message is received, a preliminary spam determination is made based, at least in part, on a combination of a reputation associated with the sender of the email message and one or more features of the email message. If the preliminary spam determination indicates that the message is spam, then a secondary spam determination is made based on one or more features of the received email message. If both the preliminary and secondary spam determinations indicate that the received email message is likely spam, then the message is treated as spam.

14 Claims, 6 Drawing Sheets

US 7,899,866 B1

USING MESSAGE FEATURES AND SENDER IDENTITY FOR EMAIL SPAM FILTERING

RELATED APPLICATION

This application is related to U.S. patent application Ser. No. 10/809,163, entitled "Training Filters for IP Address and URL Learning" filed Mar. 25, 2004, to Joshua Goodman, et al., the entirety of which is incorporated by reference herein, which is a continuation-in-part of U.S. patent application Ser. No. 10/454,168, entitled "Origination/Destination Features and Lists for Spam Prevention", filed Jun. 4, 2003, the entirety of which is incorporated by reference herein.

TECHNICAL FIELD

This invention relates to electronic mail systems, and more specifically to using message features and sender identity for email spam filtering.

BACKGROUND

With more and more individuals connected to the Internet and having electronic mail (email) accounts, it has become feasible for advertisers and other groups or individuals to disseminate advertisements and promotions to a large audience. Many such advertisements and promotions are sent as unwanted email messages (spam) to large numbers of email users.

Many email systems include filters for reducing the amount of unwanted email messages (spam). As spam filtering techniques are learned by spammers, they frequently find ways to develop email messages that can pass through spam filters. One attribute of an email message that is difficult to conceal or alter is a sender identity (e.g., an IP address or domain from which the email address was sent). Accordingly, many existing spam filters are designed to filter email based on data that indicates who sent the message or where the message was sent from, for example, by analyzing an IP address from which the message was received or by analyzing sender information that is part of a message header. Other existing spam filters are configured to filter email messages based on contents of a received message. In some existing implementations, an email filter may be designed to filter email by examining both sender information and message contents, marking a message as spam if either the sender information or the message contents indicates that the message is likely spam. While this type of spam filter may accurately identify many email messages as spam, it also tends to falsely identify email messages with innocuous content as spam. For example, a particular IP address may be identified as being the sender of a large quantity of spam messages. A non-spam message sent from the same IP address may be determined by a spam filter as being spam based solely on the sender information, when, in fact, the message contents are perfectly innocuous. This leads to user frustration and dissatisfaction with existing spam filters.

Accordingly, a need exists for a spam filter that considers both a sender identity and other features of the message (e.g., the message content) when filtering email so that a message is not identified as spam based on a sender identity unless the message contents are also at least somewhat indicative of spam.

SUMMARY

Using message features and sender identity for email spam filtering is described herein.

In an implementation of using message features and sender identity for email spam filtering, a first spam score for an email message is determined based on a combination of a reputation of the sender of the email message and features of the email message. Features may include, but are not limited to, the header lines of an email message, the words and phrases in the body of the message, the day of the week the message was sent, the time of day the message was sent, and the structure of the body of the message. If the first spam score indicates that the email message is likely to be spam, then the features of the email message are evaluated independent of the sender reputation to determine a second spam score for the email message based solely on the message features. If the first and second spam scores each independently indicate that the email message is likely spam, then the message is treated as spam. If either of the two spam scores indicates the email message is not likely spam, then the message is treated as non-spam.

BRIEF DESCRIPTION OF THE DRAWINGS

The same numbers are used throughout the drawings to reference like features and components.

DETAILED DESCRIPTION

The following discussion is directed to an electronic mail filter that determines whether or not a particular email message is unwanted (spam) based on a reputation associated with a sender of the email message and further based on the content and/or properties of the email message.

In the described exemplary implementations, the content of an email message may include, but are not limited to, any combination of the header lines of the message and the words and phrases in the body of the message. The properties of a message may include, but are not limited to, the day of the week the message was sent, the time of day the message was sent, and the structure of the body of the message. The term "features" is used to refer to any combination of content and/or properties.

When an email message is received, the spam filter determines a first spam score based at least in part on a combination of a reputation associated with the sender of the message and features of the message. If the first spam score indicates the message is not likely to be spam, then the message passes through the filter and on to the intended recipient.

However, if the first spam score indicates the message is likely to be spam, then the filter determines a second spam score based at least in part on features of the message. If the second spam score indicates the message is not likely to be spam, then the message passes through the filter and on to the intended recipient. On the other hand, if the second spam score indicates the message is likely spam, then the message is flagged as spam and handled accordingly (e.g., deleted, flagged as spam and forwarded to the recipient, forwarded to a particular mailbox associated with the recipient, etc.).

Figure 1:
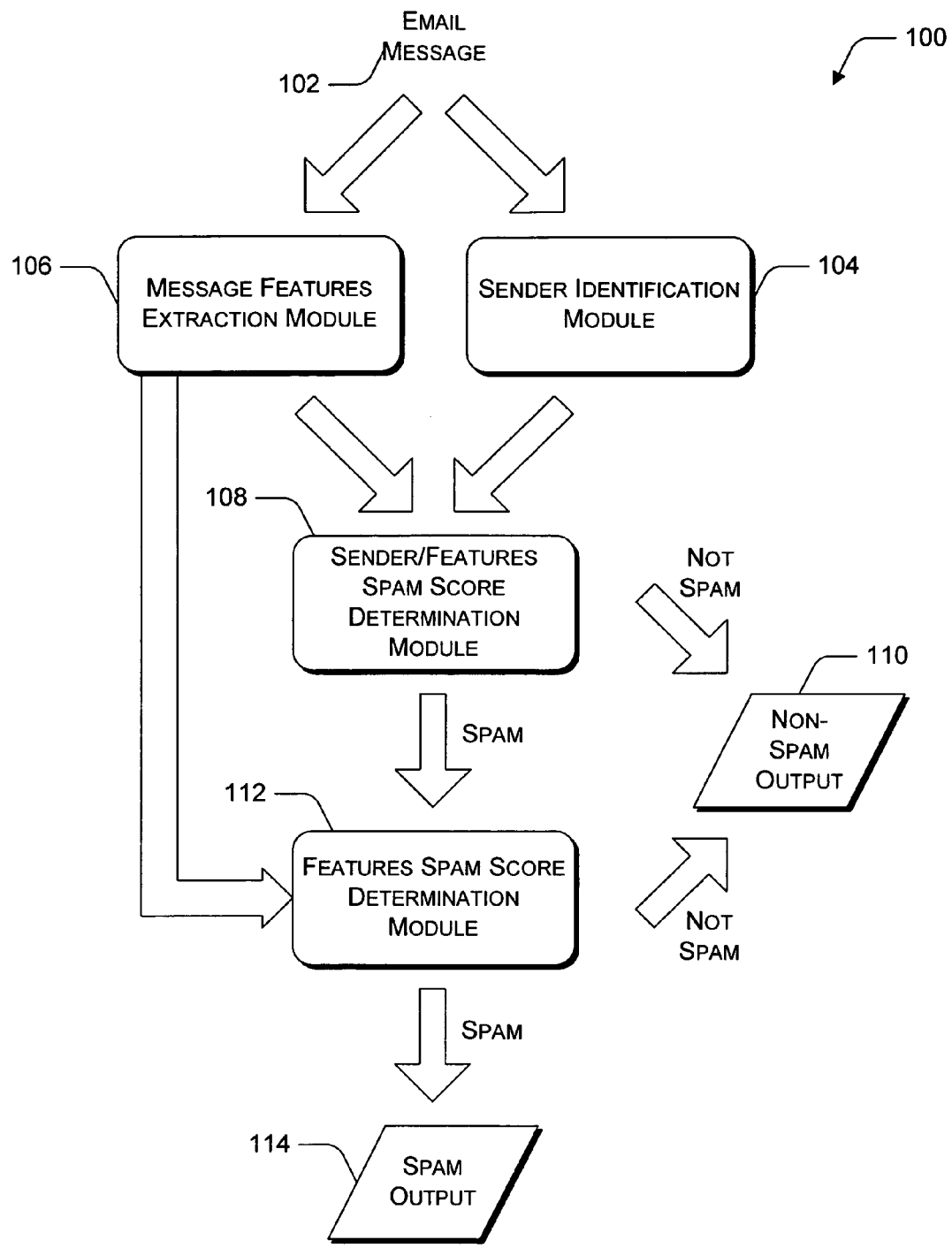
FIG. 1 is a block diagram illustrating an exemplary data flow through an implementation of an email spam filter.

FIG. 1 illustrates a data flow 100 through an exemplary implementation of an email spam filter. When email message 102 is received, sender identification module 104 identifies a sender of the message and message features extraction module 106 processes the received email message 102 to extract contents and/or properties of the message. For example, sender identification module 104 may extract data from a header associated with the email message to determine an IP address or domain from which the email message was sent, and message features extraction module 106 may extract data from, for example, a subject, header data, body text, an attachment filename, and so on.

Sender/features spam score determination module 108 determines a sender/features spam score for the received email message 102 based on a combination of a reputation associated with the identified sender of the email message and contents and/or properties of the email message.

For example, data may be gathered over a period of time that indicates a number of good email messages and a number of spam messages received from a particular sender (e.g., IP address, block of IP addresses, domain name, etc.). This data may then be used to calculate, for example, a mathematical probability that a particular email message is spam, given that the sender of the particular email message has a particular identity.

Similarly, data may be gathered over a period of time that indicates specific words and/or phrases that are found most frequently in good email messages or are found most frequently in spam email messages, or that indicates that spam tends to be sent more frequently at particular times of day or on a particular day of the week. In an exemplary implementation, the words and phrases, times of day, and days of the week, may be assigned numerical values based on how frequently each particular feature is found in good email messages compared to how frequently the same feature is found in spam email messages. This data may then be used to calculate, for example, a mathematical probability that a particular email message is spam, given the extracted contents and/or properties of the particular email message.

In the described exemplary implementation, spam scores are calculated based on mathematical probabilities. It is recognized, however, that other techniques may be used to generate spam scores, and the use of scores that represent and/or are generated based on mathematical probabilities is not to be construed as a limitation. In the described exemplary implementation, sender/feature spam score determination module 108 calculates a probability that the email message 102 is spam, given the identity of the sender, and a probability that the email message 102 is spam given the contents and/or properties of the message. The two probabilities are combined to represent a probability that the email message 102 is spam given the sender of the message and the contents and/or properties of the message. In an exemplary implementation, this may be expressed mathematically as:

$$P(spam|sender) \cdot P(spam|features)$$

where P(spam|sender) represents the mathematical probability that the message is spam given the sender of the message, and P(spam|features) represents the mathematical probability that the message is spam given the contents and/or properties of the message.

By examining both the sender reputation and message contents and/or properties on a first pass, messages from unknown senders or from senders with a good reputation may be preliminarily identified as spam based significantly, if not entirely, on the message contents and/or properties.

If the sender/feature spam score determined by sender/feature spam score determination module 108 indicates the received email message 102 is not likely spam, then a non-spam output 110 is generated. This occurs when the combination of the sender of the email message and the contents/properties of the email message suggest a significantly strong likelihood that the email message is not spam.

On the other hand, if the sender/feature spam score determined by sender/features spam score determination module 108 indicates the received email message 102 is likely spam, then features spam score determination module 112 utilizes the extracted message contents and/or properties to determine a features spam score for the received email message 102, based entirely on the extracted message contents and/or properties.

If the features spam score determined by features spam score determination module 112 indicates the received email message 102 is not likely spam, then a non-spam output 110 is generated.

On the other hand, if the features spam score determined by features spam score determination module 112 indicates the received email message 102 is likely spam, then a spam output 114 is generated.

Exemplary techniques for generating sender reputation data and message content/properties data that can be utilized by the sender spam score determination module, sender/features spam score determination module, and features spam score determination module shown in FIG. 1 is described in further detail in U.S. patent application Ser. No. 10/809,163, the entirety of which is incorporated by reference herein.

Figure 2:
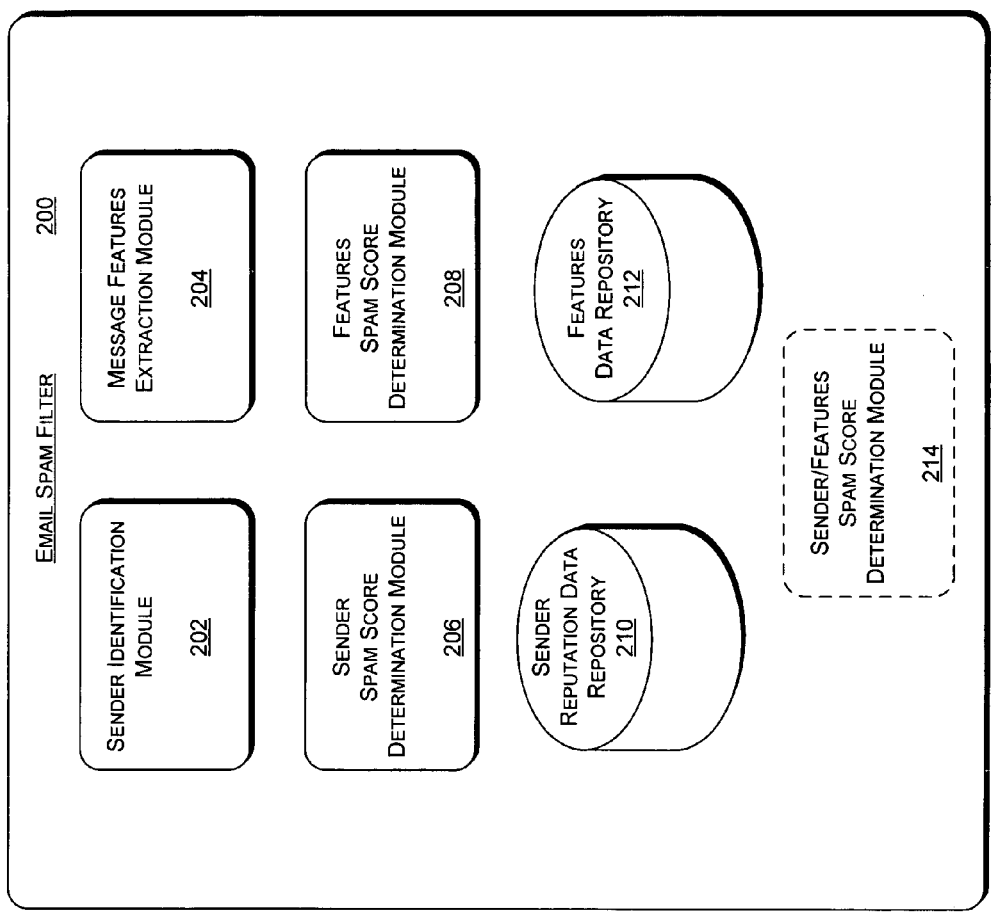
FIG. 2 is a block diagram of selected components of an exemplary email spam filter.

FIG. 2 illustrates select components of an email spam filter 200. Exemplary email spam filter 200 includes sender identification module 202, message features extraction module 204, sender spam score determination module 206, features spam score determination module 208, sender reputation data repository 210, and features data repository 212.

Sender identification module 202 is configured to determine a sender associated with a received email message. For example, sender identification module 202 may examine header data associated with the email message to identify an IP address or domain from which the email message was sent. Alternatively, sender identification module 202 may determine a range of IP addresses that includes the IP address from which the email message was sent. Sender identity is not limited to IP address and/or domain name. For example, a sending email address may be a representation of the sender's identity.

Message features extraction module 204 is configured to extract content and/or properties from the received email message. In an exemplary implementation, features may be extracted from header data, the message subject, the message body, message attachments, and/or from any other data associated with the received email message. The extracted data may include, but is not limited to, attachment filenames or words and/or phrases that are part of the message subject and/or message body, the date, time, and/or day-of-week the message was sent, and/or features derived from the structure of the message body.

Sender spam score determination module 206 is configured to determine a sender spam score for the received email message based on a reputation associated with the sender of the email message, as identified by sender identification module 202. In an exemplary implementation, data is gathered over time as various email messages are received. For a given sender identity, data is recorded in sender reputation data repository 210 indicating a number of known good email messages received from the sender and a number of known spam email messages received from the sender. For example, users may choose to provide feedback when they receive email messages indicating which email messages are good and which are bad. Over time, as more and more of this type of data are gathered, a reputation is built for a particular sender. The reputation data can then be used to generate a sender spam score that indicates whether or not the received message is likely spam, based on the identity of the sender.

Features spam score determination module 208 is configured to determine a features spam score for the received email message, based on features of the message extracted by message content extraction module 204. In an exemplary implementation, data is gathered over time as various email messages are received. For example, for a particular word or phrase, a weight value is recorded in features data repository 212. The weight value indicates the likelihood that the particular word or phrase will be found in a spam email message as opposed to a good email message. For example, the higher the weight value of a particular word, the more likely an email message containing that word is spam. Similarly, weights may be associated with times of day, days of the week, or any other features that may be determined in association with a received email message.

In an alternate implementation, email spam filter 200 may include a sender/features spam score determination module 214 in addition to, or in place of, sender spam score determination module 206. A sender/features spam score determination module 214 may be configured to determine a sender/features spam score for the received email message based on a reputation associated with the sender of the email message, as identified by sender identification module 202 and based on features of the email message extracted by message features extraction module 204. For example, sender/features spam score determination module 214 may receive input from sender identification module 202 and message features extraction module 204 to determine a sender/features spam score. Alternatively, sender/features spam score determination module 214 may receive input from sender spam score determination module 206 and features spam score determination module 208. In yet another alternate implementation, sender/features spam score determination module 214 may receive input from sender identification module 202 and features spam score determination module 208

Figure 3:
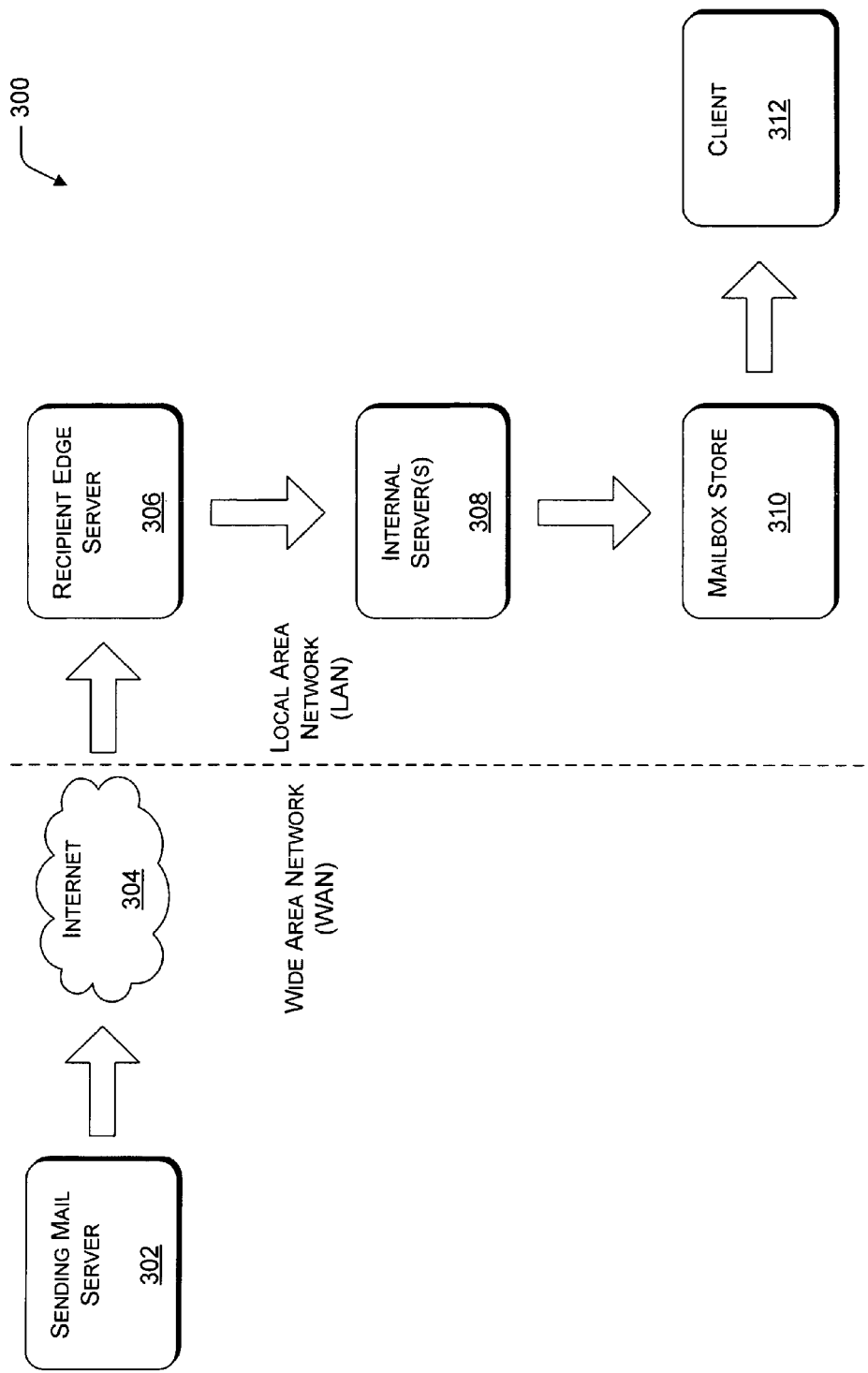
FIG. 3 is a block diagram of an exemplary network environment in which an email spam filter may be implemented.

FIG. 3 illustrates an exemplary network environment 300 in which email spam filtering may be implemented. An email message is generated and communicated via sending mail server 302 across a wide area network (WAN) such as the Internet 304. The email message is received by a server associated with a local area network (LAN), such as recipient edge server 306.

Recipient edger server 306 represents a LAN server that is configured to receive email messages directly from the Internet 304. When recipient edge server 306 receives an email message, the email message is forwarded to an internal server 308 that is associated with the LAN. The email message may pass through multiple internal servers 308 before being forwarded to mailbox store 310, which can be accessed by a client 312 running an email client application.

Email spam filter 200 may be implemented as a component of recipient edge server 306, as a component of any of internal servers 308, as a component of mailbox store 310, or as a component of client 312. Alternatively, components of email spam filter 200 may be distributed across multiple LAN servers or systems. For example, sender identification module 202 may be implemented as a component of recipient edge server 306 while the remaining component of email spam filter 200 may be implemented as components of internal server 308. Furthermore, an exemplary implementation of network environment 300 may include any number of (including zero) internal servers 308. Alternatively, in an exemplary implementation of network environment 300, mailbox store 310 may be implemented as a component of one or more internal servers 308, or there may be no internal servers 308 and mailbox store 310 may be implemented as a component of recipient edge server 306.

Figure 4:
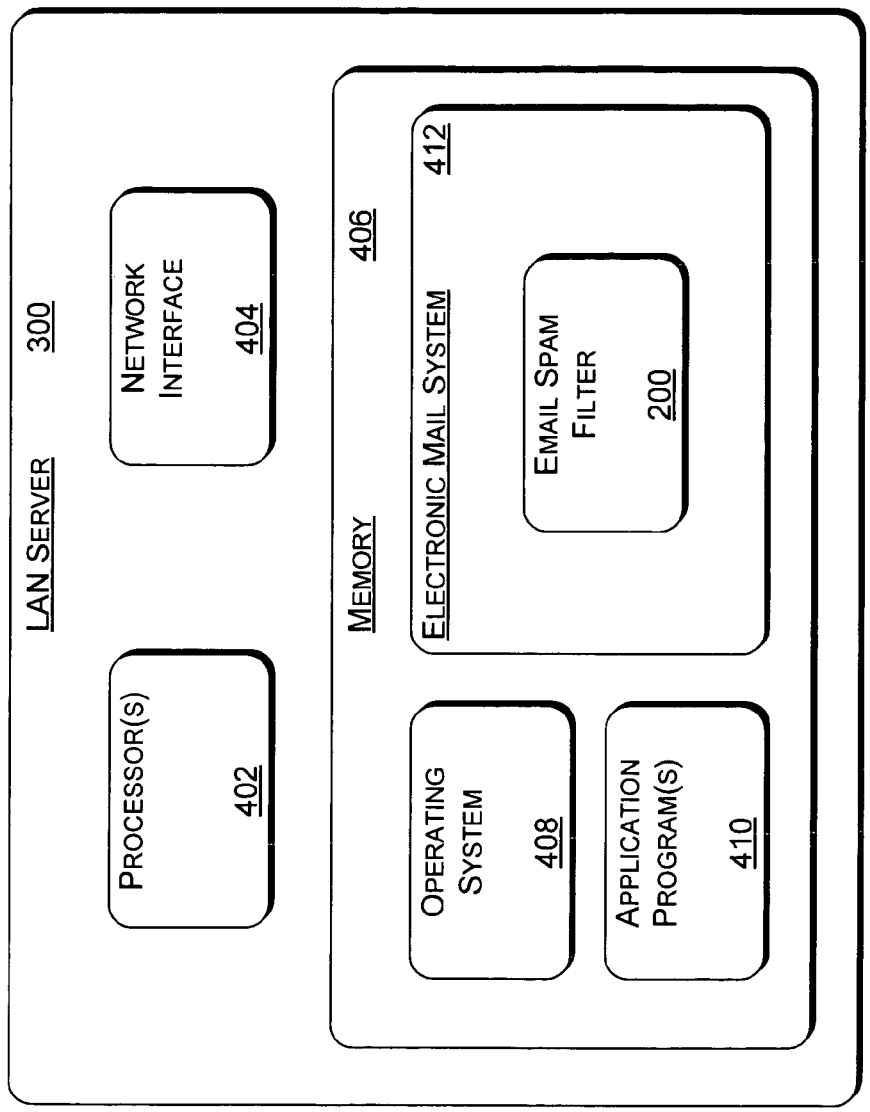
FIG. 4 is a block diagram of selected components of an exemplary local area network server implemented to include an email spam filter.

FIG. 4 illustrates select components of an exemplary local area network (LAN) server 300 that is implemented to include an email spam filter 200 as described above with reference to FIG. 2. LAN server 300 includes one or more processors 402, a network interface 404, and memory 406. Network interface 404 enables LAN server 300 to communicate with other computer systems via the local area network, and/or via a wide area network such as the Internet.

An operating system 408 and one or more application programs 410 are stored in memory 406 and executed on processor 402. An electronic mail system 412 is also stored in memory 406 and includes email spam filter 200. Electronic mail system 412 may be configured to perform any number of email related tasks, including, but not limited to, receiving email, filtering email, virus scanning email, and delivering email. Exemplary components of email spam filter 200 are described above with reference to FIG. 2.

LAN server 300 may be representative of recipient edge server 306, and/or one or more internal servers 308, as described above with reference to FIG. 3. Also, as described above, components of email filter 200 may be distributed across multiple servers, such as recipient edge server 306 and internal servers 308.

Figure 5:
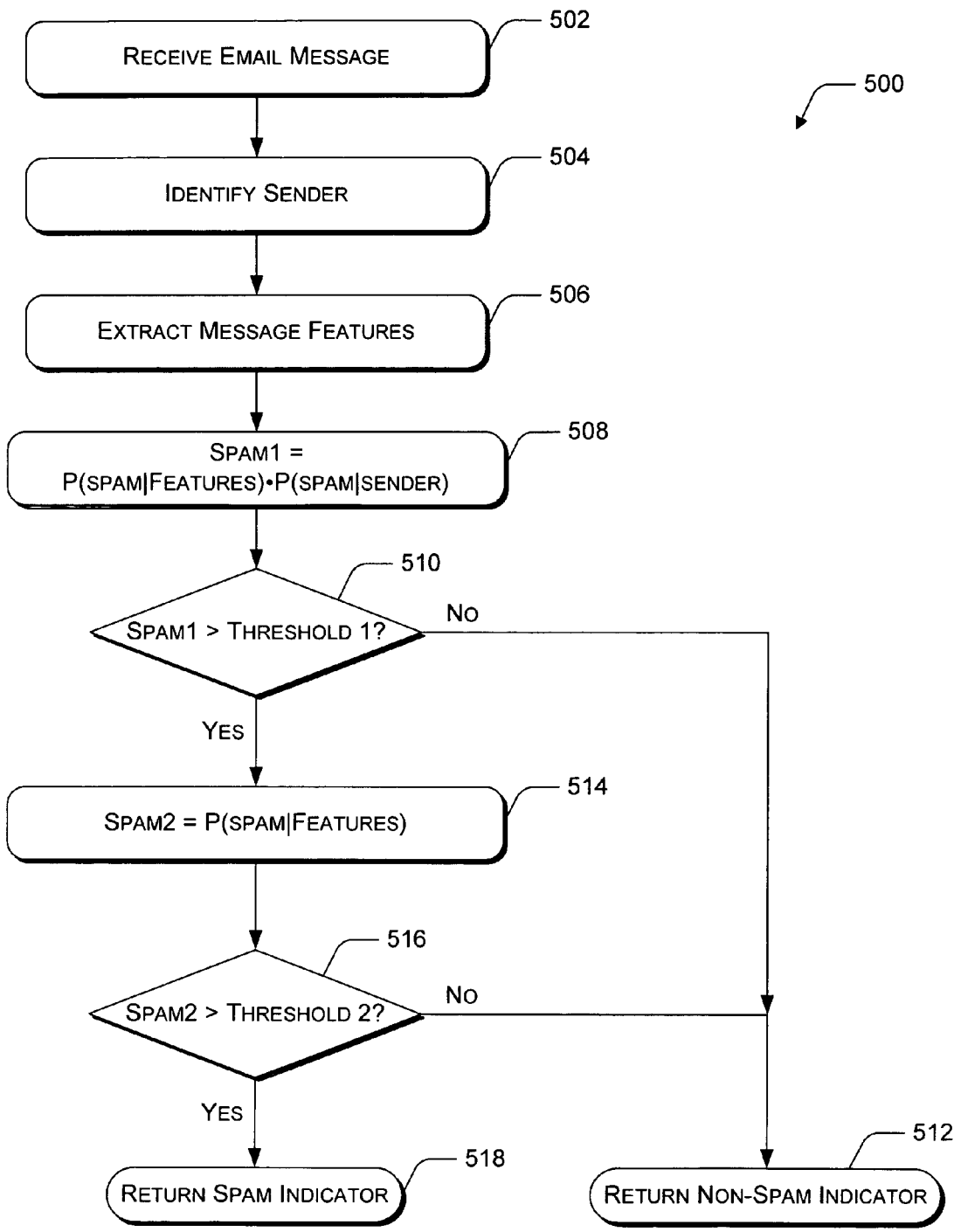
FIG. 5 is a flow diagram of an exemplary method for filtering electronic mail to identify spam.

Methods for email spam filtering, such as exemplary methods 500 and 600 described below with reference to FIGS. 5 and 6, respectively, may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices FIG. 5 illustrates an exemplary method 500 for an embodiment of email spam filtering. The order in which the method is described is not intended to be construed as a limitation, and any number of the described method blocks can be combined in any order to implement the method. Furthermore, the method can be implemented in any suitable hardware, software, firmware, or combination thereof.

At block 502, the spam filter receives an incoming email message.

At block 504, the spam filter identifies the sender of the email message. For example, referring to FIG. 2, sender identification module 202 may determine an IP address from which the email message was sent.

At block 506, the spam filter extracts features of the message. For example, message features extraction module 204 may extract words and/or phrases from the message body, message subject, attachment filenames, and/or any other part o the email message.

At block 508, the spam filter calculates:

$$\text{Spam1} = P(\text{spam}|\text{features}) \cdot P(\text{spam}|\text{sender})$$

where P(spam|features) represents a probability that the message is spam given extracted features of the message, and P(spam|sender) represents a probability that the message is spam given a reputation of the sender of the message.

That is, the spam filter calculates a probability that the received message is spam, given the features of the message, denoted by P(spam|features), multiplied by a probability that the received message is spam given the sender of the message, denoted by P(spam|sender).

P(spam|features) may be calculated in any number of ways. In an exemplary implementation, P(spam|features) is calculated based on a function of weight values that are assigned to words found in the message. For example, a database of words and their associated weights may be maintained in association with the spam filter (e.g., features data repository 212). In an exemplary implementation, a weight value is assigned to a particular word based on the likelihood that the particular word will appear in a spam email message and not in a non-spam email message. For example, words like "family", "mom", "dad", "friend", and so on may be assigned low weight values, indicating that these words are most likely to occur in non-spam email messages and less likely to occur in spam email messages. On the other hand, words and phrases like "sale", "special offer", "limited time only", "mortgage", "debt-free", and so on may be assigned high weight values, indicating that these words are more likely to occur in spam email messages and less likely to occur in non-spam email messages.

To calculate P(spam|features), features spam score determination module 208 calculates the sum of the weights associated with the words found in the email message (W=Σ weights). Features spam score determination module 208 then applies the Sigmoid function $(y=1/(1+e^{-t}))$ to convert the sum of the weight values to a probability (i.e., a value between 0 and 1). Accordingly:

$$P(\text{spam}|\text{features}) = 1/(1+e^{-W}).$$

Similarly, P(spam|sender) may be calculated in any number of ways. In an exemplary implementation, a spam probability associated with a particular sender IP address is determined by gathering data over time. For example, email recipients may provide feedback over time, indicating which email message they have received are spam and which are not. This data may be stored, for example, in sender reputation data repository 210, and used by sender spam score determination module 206 to calculate a count of spam email messages that have been received from a particular IP address ($S_{count}$) and a count of non-spam email messages that have been received from the IP address ($G_{count}$). A probability that an email message received from that IP address can then be calculated as:

$$P(\text{spam}|\text{sender}) = S_{count}/(S_{count}+G_{count})$$

Spam1=P(spam|features)·(P(spam|sender) can then be calculated as:

$$\text{Spam1} = (1/(1+e^{-W})) \cdot (S_{count}/S_{count}+G_{count}))$$

In an exemplary implementation, sender/features spam score determination module 214 may be configured to calculate Spam1, for example, based on outputs from sender spam score determination module 206 and features spam score determination module 208.

At block 510, Spam1 is then compared to a first threshold value, Threshold1, to determine, based at least in part on a reputation of the sender, if the received message is likely to be spam.

If Spam1<Threshold1 (the "No" branch from block 510), then it is determined that the received email message is probably not spam, and at block 512, the spam filter returns a non-spam indicator.

On the other hand, if Spam1>Threshold1 (the "Yes" branch from block 510), then it is determined that there is a high likelihood that the received email message is spam. For example, Threshold1 may be equal to 0.90, meaning that a received email message is flagged as potentially being spam if there is a 90% chance that the message is spam. At block 514, features spam score determination module 208 calculates Spam2=P(spam|features). As described above, $P(\text{spam}|\text{features})=1/(1-e^{-W})$, where W=Σ weights associated with words found in the message.

At block 516, Spam2 is compared to a second threshold value, Threshold2, to determine, based on the contents of the email message, if the received message is likely to be spam. For example, Threshold2 may be 0.50. In such an implementation, the received message will be flagged as spam if Spam1>0.90 and Spam2>0.50.

If Spam2<Threshold2 (the "No" branch from block 516), then it is determined that the received email message is probably not spam, and at block 512, the spam filter returns a non-spam indicator.

On the other hand, if Spam2>Threshold2 (the "Yes" branch from block 516), then it is determined that there is a high likelihood that the received email message is spam, and at block 518, the spam filter returns a spam indicator.

Process 500 described above may be effective for filtering email messages that are received from an IP address from which a substantial number of email messages have been previously received and for filtering email messages that have substantial spam-related content. That is, as described above, $P(\text{spam}|\text{sender})=S_{count}/S_{count}+G_{count}$, where $S_{count}$ is equal to a count of known spam messages that have been received from a particular IP address and where $G_{count}$ is equal to a count of known non-spam messages that have been received from the same IP address. This calculation becomes more meaningful as more data is collected in association with a particular IP address. This calculation, however, is virtually meaningless for an IP address from which no (or very few) previous email messages have been received. In such a situation, the calculation of P(spam|sender), as described above with reference to block 508, can be modified to provide a more meaningful result.

IP addresses are typically 32-bit numbers (IP version 6 addresses are longer numbers), each of which uniquely identifies a particular computer on a TCP/IP network. Each computer system that is connected to the Internet has a unique IP address. Furthermore, IP addresses are typically assigned in blocks. For example, a large company that will have several computers connected to the Internet may request two-hundred IP addresses for its use. The two-hundred IP addresses that are assigned to that company are typically assigned as a block of two-hundred consecutively numbered IP addresses. Accordingly, multiple computers associated with a single Internet domain will typically have IP addresses that are numbered relatively close to each other.

Accordingly, in an alternate implementation, P(spam|sender) may be calculated as $P(\text{spam}|\text{sender})=S_{count}/$ ($S_{count}+G_{count}$), where $S_{count}$ is equal to a count of known spam messages that have been received from a particular range of IP addresses and where $G_{count}$ is equal to a count of known non-spam messages that have been received from the same range of IP addresses, and where the sender has an IP address that is within the same range of IP addresses.

As an example, an email filter may attempt to calculate P(spam|sender) based on a particular IP address associated with the sender. However, if there is not enough data that has been previously collected in association with the particular email address (e.g., less than 1000 email messages), then the email filter may attempt to calculate P(spam|sender) based on the top 24 bits of the IP address associated with the sender. Using the top 24 bits of the IP address results in the probability that the received email message is spam based on data collected in association with email messages associated with a block of 256 IP addresses that includes the IP address from which the received email message was sent.

Similarly, if there is not enough data associated with the block of 256 IP addresses to provide a meaningful result, then P(spam|sender) may be calculated based on the top 16 bits of the IP address, which represents a block of 64,000 IP addresses.

Similarly, if an email sender is identified by a domain name, portions of the domain name may have an associated reputation that is more meaningful (based on a larger sample of data) than the specific domain name from which the email was sent.

Handling of an email message that is flagged as spam may also differ from one implementation to another. For example, in one implementation, any email message that is identified as probably being spam may be deleted, and never put into the recipient's inbox. Alternatively, email messages that are identified as probably being spam may be put into a specific mailbox associated with the recipient (e.g., a junk mailbox). In yet another implementation, email messages that are identified as probably being spam may be flagged and put into the recipient's inbox. Any type of processing may be performed in association with an email message that is flagged as either being spam or as not being spam.

Figure 6:
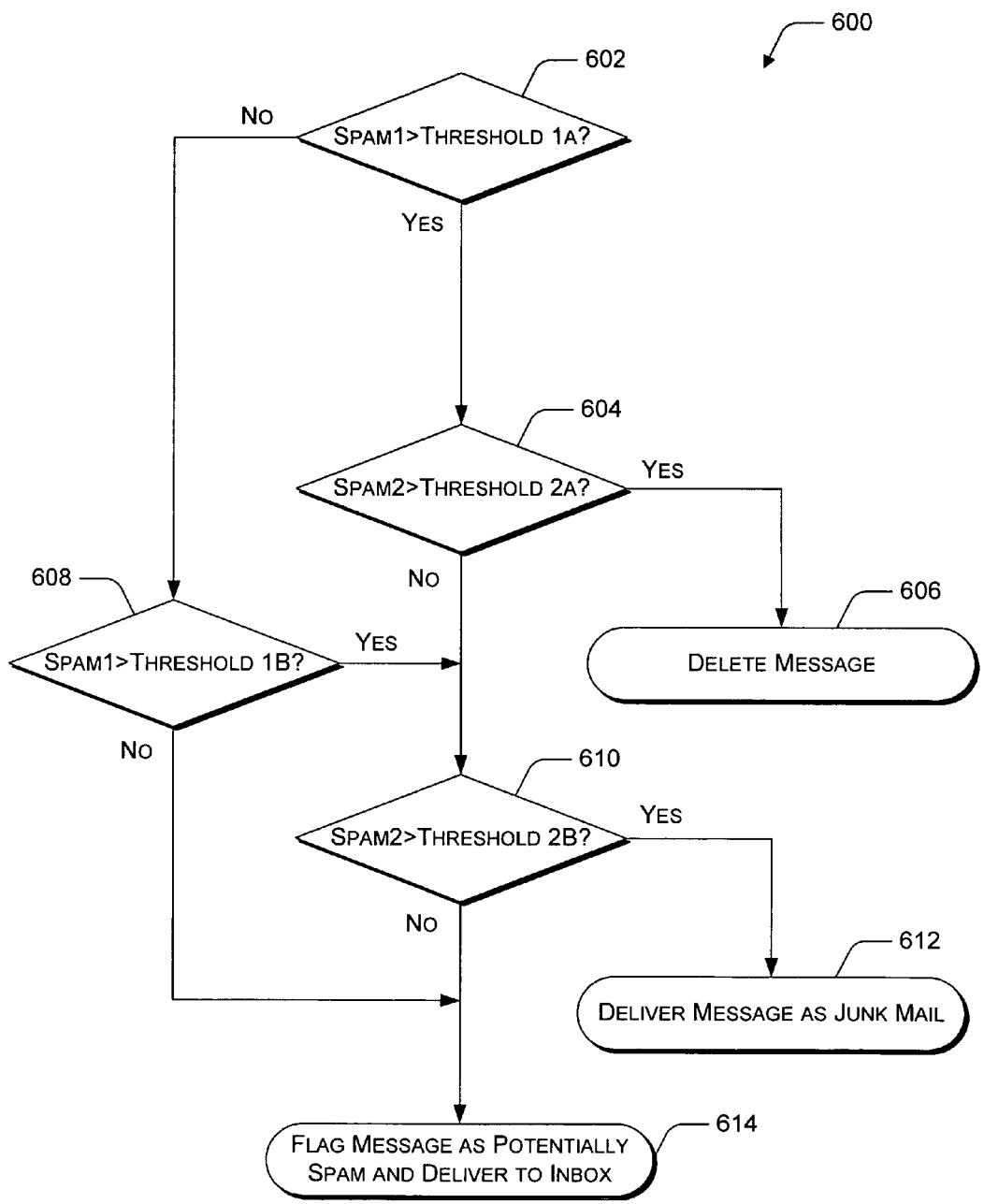
FIG. 6 is a flow diagram of an exemplary method for handling an email message that is flagged as spam.

FIG. 6 illustrates an exemplary method 600 for handling an email message that is flagged as spam. The order in which the method is described is not intended to be construed as a limitation, and any number of the described method blocks can be combined in any order to implement the method. Furthermore, the method can be implemented in any suitable hardware, software, firmware, or combination thereof.

In an exemplary implementation, an email system may process email messages differently depending on the likelihood of each individual message being spam. For example, rather than just two threshold values, the email filter may employ multiple threshold values. For example, assume an implementation in which Threshold1a=0.99; Threshold1b=0.90; Threshold1c=0.85; Threshold2a=0.75; Threshold2b=0.60; and Threshold2c=0.50. If Spam1>Threshold1a and Spam2>Threshold2a, then the received email message may be deleted; if Spam1>Threshold1b and Spam2>Threshold2b, then the received email message may be put into a junk mailbox; and if Spam1>Threshold1c and Spam2>Threshold2c, then the received email message may be flagged as potentially being spam and placed in the recipients inbox. The specific threshold values discussed herein are merely examples, and are not intended as limitations.

Such an implementation is illustrated in FIG. 6, the steps of which may be performed as part of the method illustrated in FIG. 5, or as additional processing performed either by an email spam filter or by another email system based on results received from the spam filter. For example, the processing illustrated in FIG. 6 may be performed between blocks 516 and 518 of FIG. 5, if implemented as part of email spam filter 200. Alternatively, the processing illustrated in FIG. 6 may be performed by electronic mail system 412 after receiving an indication that the received email message is likely spam (as indicated by block 518 of FIG. 5). Accordingly, when the processing shown in FIG. 6 begins, it has already been determined that the received email message has a first spam score (Spam1) that is greater than threshold1 and a second spam score (Spam2) that is greater than threshold2.

In the illustrated example, threshold1a is assumed to be greater than threshold1b, which is assumed to be greater than or equal to threshold1 (see block 510 of FIG. 5). Similarly, threshold 2a is assumed to be greater than threshold2b, which is assumed to be greater than or equal to threshold2 (see block 516 of FIG. 5).

At block 602, the value of Spam1 (calculated as described above with reference to block 508 of FIG. 5) is compared to threshold1a.

If Spam1>threshold1a (the "Yes" branch from block 602), then at block 604, the value of Spam2 (calculated as described above with reference to block 514 of FIG. 5) is compared to the threshold2a.

If Spam2>threshold2a (the "Yes" branch from block 602), which indicates that both the sender reputation and the message features indicate a high likelihood that the message is spam, then at block 606, the message is deleted.

On the other hand, if Spam1<=threshold1a (the "No" branch from block 602), then at block 608, the value of Spam1 is compared to threshold1b.

If Spam1>threshold1b (the "Yes" branch from block 608), and/or Spam2<=threshold2a (the "No" branch from block 604), then at block 610, the value of Spam2 is compared to threshold2b.

If Spam2>threshold2b (the "Yes" branch from block 610), which indicates that both the sender reputation and the message features indicate at least a medium likelihood that the message is spam, then at block 612, the message is delivered to a junk mail folder associated with the intended message recipient.

On the other hand, if Spam1<=threshold1b (the "No" branch from block 608) and/or Spam2<=threshold2b (the "No" branch from block 610), then at block 614, the email message is flagged as being potentially spam and delivered to an inbox associated with the intended message recipient.

The method illustrated in FIG. 6 is merely an example, and it is recognized that any number of relative thresholds may be implemented, and any type of processing/delivery modifications may be performed based on a comparison of one or more spam scores with the threshold values.

Although embodiments of email spam filtering have been described in language specific to structural features and/or methods, it is to be understood that the subject of the appended claims is not necessarily limited to the specific features or methods described. Rather, the specific features and methods are disclosed as exemplary implementations of email spam filtering.

The invention claimed is:

1. A method comprising:
  receiving an email message;
  determining a sender identity associated with the email message based on a particular IP address from which the email message was sent;
  calculating a probability that the email message from the sender is spam based on the particular IP address;

in an event that there is not enough data that has been previously collected in association with the particular IP address to calculate the probability that the email message from the sender is spam, calculating the probability that the sender's email address is spam according to data associated with a first range of IP addresses based on a top 24 bits of the particular IP address;

in an event that there is not enough data that has been previously collected in association with the top 24 bits of the particular IP address to calculate the probability that the email message from the sender is spam, calculating the probability that the sender's email message is spam according to data associated with a second range of IP addresses based on a top 16 bits of the particular IP address;

identifying features of the email message;

determining a first spam score based, at least in part, on a combination of a reputation associated with the sender identity and data associated with the features of the email message, wherein the reputation indicates whether email messages received from the sender identity tend to be spam, and wherein the data associated with the features of the email message indicates whether email messages having the features tend to be spam;

comparing the first spam score to a first spam score threshold 1a, wherein 1a represents a maximum allowable first spam score; and in an event that the first spam score is greater than the first spam score threshold:

determining a second spam score based, at least in part, on the data associated with the features of the email message;

applying different treatments to the email message based on a combination of a first relationship between the first spam score and three first spam score threshold values including 1a, 1b, and 1c, and a second relationship between the second spam score and three second spam score threshold values including 2a, 2b, and 2c, 1a being higher than 1b, 1b being higher than 1c, 2a being higher than 2b, and 2b being higher than 2c, the three first spam score threshold values being different from the three second spam score threshold values and 1a being higher than 2a, in an event that the first spam score is greater than 1a and the second spam score is greater than 2a, deleting the email message;

in an event that the first spam score is smaller than 1a but greater than 1b and the second spam score is smaller than 2a but greater than 2b, delivering the email message into a junk email box; and in an event that the first spam score is smaller than 1b but greater than 1c and the second spam score is smaller than 2b but greater than 2c, flagging the email message as potentially being spam and delivering the email message into an email inbox, wherein:

the features include:
  a particular word or phrase appeared in the email message;
  a particular word or phrase appeared in an attachment of the email message;
  a header line of the email message;
  a day of a week the email message is sent;
  a time of a day the email message is sent; and
  a structure of a body of the email message;

each particular features is assigned a numerical value based on a frequency of each particular feature is found in a good email message compared to a frequency of each particular feature is found in a spam email message;

the reputation associated with the sender identity is gathered from a user's feedback indicating a number of spam email message from the sender identity and a number of non-spam email message from the sender identity;

the indication is reflected by a numerical value; and the determining operation of the second spam score comprises calculating a Sigmoid function, $1/(1+e^{-w})$, w being a sum of weighted values associated with the features of the email message, the Sigmoid function converting the sum of weighted values to a probability as a real number in a range [0, 1].

2. The method as recited in claim 1, wherein determining the sender identity further comprises determining at least one of a group of sequentially numbered IP addresses of which an IP address from which the email address was sent is a member, an allocation of IP addresses of which an IP address from which the email address was sent is a member, a domain from which the email address appears to have been sent.

3. The method as recited in claim 1, wherein determining the first spam score comprises:

determining a first probability that the email message is spam, given the sender identity;

determining a second probability that the email message is spam, given the one or more features of the email message; and combining the first probability and the second probability.

4. The method as recited in claim 3, wherein the combining comprises multiplying the first probability by the second probability.

5. The method as recited in claim 1, wherein the first spam score comprises a real number in the range [0, 1].

6. The method as recited in claim 3, wherein determining a first probability that the email message is spam, given the sender identity comprises calculating $S_{count}/(S_{count}+G_{count})$, where $S_{count}$ represents a number of previously received spam email messages associated with the sender identity and where $G_{count}$ represents a number of previously received non-spam email messages associated with the sender identity.

7. The method as recited in claim 1, wherein determining the second spam score comprises calculating a probability that the email message is spam given the one or more features of the email message.

8. One or more computer-readable storage media comprising computer-executable instructions that, when executed, direct a computing system to perform a method, the method comprising:

receiving an email message;

determining a sender identity associated with the email message based on a particular IP address from which the email message was sent;

calculating a probability that the email message from the sender is spam based on the particular IP address;

in an event that there is not enough data that has been previously collected in association with the particular IP address to calculate the probability that the email message from the sender is spam, calculating the probability that the sender's email message is spam according to data associated with a first range of IP addresses based on a top 24 bits of the particular IP address;

in an event that there is not enough data that has been previously collected in association with the top 24 bits of the particular IP address to calculate the probability that the email message from the sender is spam, calculating the probability that the sender's email address is spam according to data associated with a second range of IP addresses based on a top 16 bits of the particular IP address;

identifying features of the email message;

determining a first spam score based, at least in part, on a combination of a reputation associated with the sender identity and data associated with the features of the email message, wherein the reputation indicates whether email messages received from the sender identity tend to be spam, and wherein the data associated with the features of the email message indicates whether email messages having the features tend to be spam;

comparing the first spam score to a first spam score threshold 1a, wherein 1a represents a maximum allowable first spam score; and in an event that the first spam score is greater than the first spam score threshold:

determining a second spam score based, at least in part, on the data associated with the features of the email message;

applying different treatments to the email message based on a combination of a first relationship between the first spam score and three first spam score threshold values including 1a, 1b, and 1c, and a second relationship between the second spam score and three second spam score threshold values including 2a, 2b, and 2c, 1a being higher than 1b, 1b being higher than 1c, 2a being higher than 2b, and 2b being higher than 2c, the three first spam score threshold values being different from the three second spam score threshold values and 1a being higher than 2a, in an event that the first spam score is greater than 1a and the message second spam score is greater than 2a, deleting the email message;

in an event that the first spam score is smaller than 1a but greater than 1b and the second spam score is smaller than 2a but greater than 2b, delivering the email message into a junk email box; and in an event that the first spam score is smaller than 1b but greater than 1c and the second spam score is smaller than 2b but greater than 2c, flagging the email message as potentially being spam and delivering the email message into an email inbox, wherein:

the features include:
- a particular word or phrase appeared in the email message;
- a particular word or phrase appeared in an attachment of the email message;
- a header line of the email message;
- a day of a week the email message is sent;
- a time of a day the email message is sent; and
- a structure of a body of the email message;

each particular features is assigned a numerical value based on a frequency of each particular feature is found in a good email message compared to a frequency of each particular feature is found in a spam email message;

the reputation associated with the sender identity is gathered from a user's feedback indicating a number of spam email message from the sender identity and a number of non-spam email message from the sender identity;

the indication is reflected by a numerical value; and the determining operation of the second spam score comprises calculating a Sigmoid function, $1/(1+e^{-w})$, w being a sum of weighted values associated with the features of the email message, the Sigmoid function converting the sum of weighted values to a probability as a real number in a range [0, 1].

9. The one or more computer-readable storage media as recited in claim 8, wherein the probability that the email message from the sender is spam is calculated based on a domain name, a sending email address, or a combination thereof.

10. The one or more computer-readable storage media as recited in claim 8, wherein the features of the email message comprise a message subject, message header data, textual message contents, a message attachment filename, a textual content of a message attachment, or a combination thereof.

11. The one or more computer-readable storage media as recited in claim 8, the method further comprising calculating the first spam score as a mathematical probability that the email message is spam given the entity from which the email message was sent and given the features of the email message.

12. The one or more computer-readable storage media as recited in claim 8, wherein the method further comprising:

calculating a first mathematical probability that the email message is spam given the entity from which the email message was sent, based on data generated from email messages that were previously received from the entity from which the email message was sent;

calculating a second mathematical probability that the email message is spam given the features of the email message, based on data generated from email message that were previously received having the one or more features of the email message; and calculating the first spam score as a combination of the first and second mathematical probabilities.

13. The one or more computer-readable storage media as recited in claim 8, embodied as at least one of an electronic mail server system or an electronic mail client application.

14. An electronic mail filter computing system comprising:

one or more processors;

one or more memories communicatively coupled to the one or more processors, the one or more memories having stored instructions that, when executed, configure the computing system to implement an email spam filter comprising a sender reputation data store, a features date store, a sender identification module, a message features extraction module, a features spam score determination module, and a sender spam score determination module, the email spam filter configured to:

receive an email message;

determine a sender identity associated with the email message based on a particular IP address from which the email message was sent;

calculate a probability that the email message from the sender is spam based on the particular IP address;

in an event that there is not enough data that has been previously collected in association with the particular IP address to calculate the probability that the email message from the sender is spam, calculate the probability that the sender's email message is spam according to data associated with a first range of IP addresses based on a top 24 bits of the particular IP address;

in an event that there is not enough data that has been previously collected in association with the top 24 bits of the particular IP address to calculate the probability that the email message from the sender is spam, calculate the probability that the sender's email address is spam according to data associated with a second range of IP addresses based on a top 16 bits of the particular IP address;

identify features of the email message;

determine a first spam score based, at least in part, on a combination of a reputation associated with the sender identity and data associated with the features of the email message, wherein the reputation indicates whether email messages received from the sender identity tend to be spam, and wherein the data associated with the features of the email message indicates whether email messages having the features tend to be spam;

compare the first spam score to a first spam score threshold $1a$, wherein $1a$ represents a maximum allowable first spam score; and in an event that the first spam score is greater than the first spam score threshold:

determine a second spam score based, at least in part, on the data associated with the features of the email message;

apply different treatments to the email message based on a combination of a first relationship between the first spam score and three first spam score threshold values including $1a$, $1b$, and $1c$, and a second relationship between the second spam score and three second spam score threshold values including $2a$, $2b$, and $2c$, $1a$ being higher than $1b$, $1b$ being higher than $1c$, $2a$ being higher than $2b$, and $2b$ being higher than $2c$, the three first spam score threshold values being different from the three second spam score threshold values and $1a$ being higher than $2a$, in an event that the first spam score is greater than $1a$ and the message second spam score is greater than $2a$, delete the email message;

in an event that the first spam score is smaller than $1a$ but greater than $1b$ and the second spam score is smaller than $2a$ but greater than $2b$, deliver the email message into a junk email box; and in an event that the first spam score is smaller than $1b$ but greater than $1c$ and the second spam score is smaller than $2b$ but greater than $2c$, flag the email message as potentially being spam and deliver the email message into an email inbox, wherein:

the features include:
  a particular word or phrase appeared in the email message;
  a particular word or phrase appeared in an attachment of the email message;
  a header line of the email message;
  a day of a week the email message is sent;
  a time of a day the email message is sent; and
  a structure of a body of the email message;

each particular features is assigned a numerical value based on a frequency of each particular feature is found in a good email message compared to a frequency of each particular feature is found in a spam email message;

the reputation associated with the sender identity is gathered from a user's feedback indicating a number of spam email message from the sender identity and a number of non-spam email message from the sender identity;

the indication is reflected by a numerical value; and the operation to determine the second spam score comprises calculating a Sigmoid function, $1/(1+e^{-w})$, w being a sum of weighted values associated with the features of the email message, the Sigmoid function converting the sum of weighted values to a probability as a real number in a range $[0, 1]$.

* * * * *